2 Sheets—Sheet 1.

J. H. MILTIMORE,

Assignor, by mesne assignments, to THE ADAMS AND WESTLAKE MANUFACTURING COMPANY.

Lantern.

No. 9,422. Reissued Oct. 19, 1880

Attest:
Robt. H. Duncan
Philip J. O'Reilly

Inventor:
J. H. Miltimore
The Adams & Westlake Mnfg Co.
by Paul A. Duncan
atty

N. PETERS, PHOTO-LITHOGRAPHER, WASHINGTON, D. C.

J. H. MILTIMORE,

Assignor, by mesne assignments, to THE ADAMS AND WESTLAKE MANUFACTURING COMPANY.

Lantern.

No. 9,422. Reissued Oct. 19, 1880.

Attest:
Robt. H. Duncan
Philip Jo. Reilly

Inventor:
J. H. Miltimore
The Adams & Westlake Mnfg. Co.
by Robt. A. Duncan Atty

N. PETERS, PHOTO-LITHOGRAPHER, WASHINGTON, D. C.

UNITED STATES PATENT OFFICE.

THE ADAMS & WESTLAKE MANUFACTURING COMPANY, OF CHICAGO, ILL., ASSIGNEE, BY MESNE ASSIGNMENTS, OF J. H. MILTIMORE.

LANTERN.

SPECIFICATION forming part of Reissued Letters Patent No. 9,422, dated October 19, 1880.

Original No. 49,290, dated August 8, 1865; Reissue No. 2,555, dated April 9, 1867. Application for reissue filed August 23, 1880.

*To all whom it may concern:*

Be it known that J. H. MILTIMORE, of Chicago, in the county of Cook and State of Illinois, assignor, by mesne assignments, to THE ADAMS & WESTLAKE MANUFACTURING COMPANY, having its principal place of business in said city of Chicago, has invented a new and useful Improvement in Lanterns, of which the following is a full, clear, and exact description.

This invention relates to the class of lanterns known as "loose-globe lanterns," or lanterns in which the globe is not secured in its bearings by cement; and it consists, in part, in so constructing the frame of the lantern that the globe can be readily removed through the base thereof, for the purpose of cleaning it or for the introduction of another when one is broken.

It also consists in a novel method of securing the lamp in place; also, in the use of an adjustable device to fasten the globe in its seat to prevent it from rattling and thus becoming broken.

Figure 1:
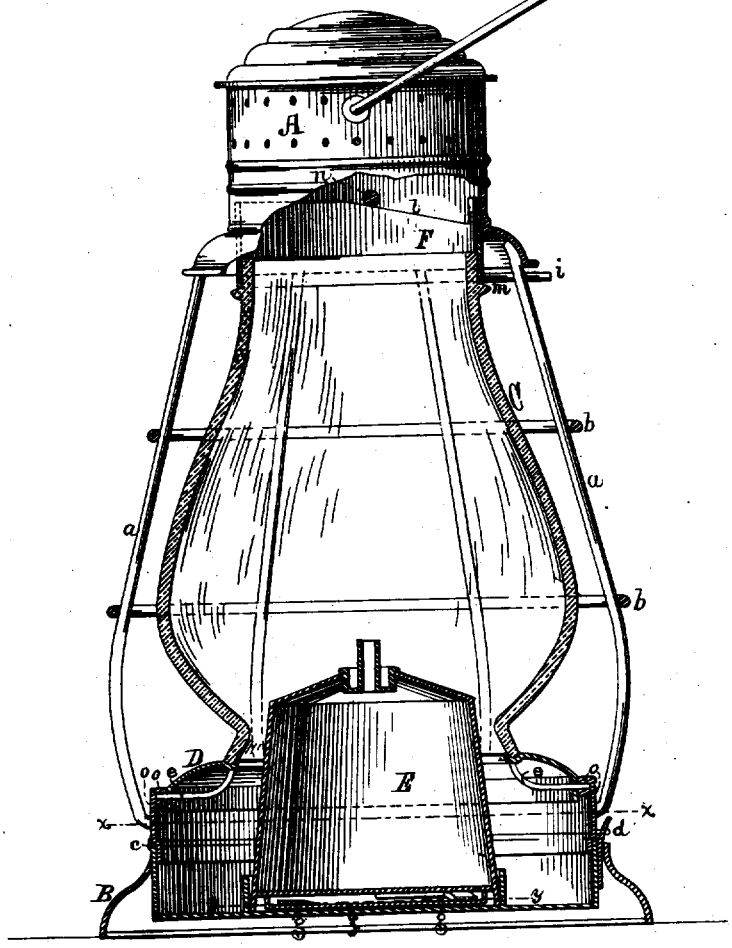
Figure 2:
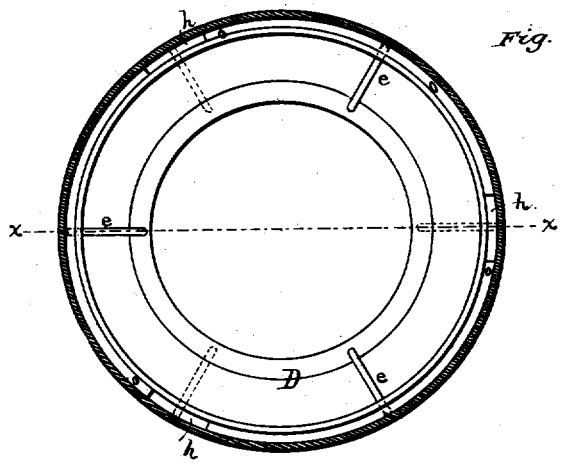
Figure 3:
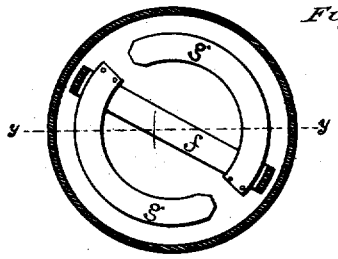
Figure 4:
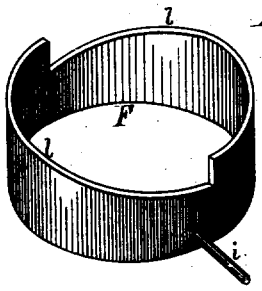

The invention is fully illustrated in the accompanying drawings, in which Figure 1 is a vertical sectional view of a lantern embodying the invention. Fig. 2 is a plan of the base-section through the line *x x* of Fig. 1, looking upward, the lamp and bottom plate being removed. Fig. 3 is a plan of the bottom plate of the base, and Fig. 4 shows the adjustable globe-tightening ring.

In the drawings, A represents the upper portion of the lantern, constructed in any of the usual forms, and rigidly united to the base B by the wires *a a*. Two or more wires, *b b*, pass around and are soldered or otherwise attached to the wires *a a*, as shown in Fig. 1, firmly uniting them, and thereby forming a firm and strong frame, which serves the double purpose of uniting the top and the base, and also of protecting the globe C, placed inside of the same.

The base or bottom portion of the frame is composed of two parts, hinged together at *c*, a spring-catch, *d*, on the opposite side serving to hold them together, as shown. The upper section of the base is left open to nearly or quite its full diameter, so that the globe can be inserted through it into the interior of the wire guard or frame. An annular piece of sheet metal, D, (shown in section in Fig. 1 and in plan in Fig. 2,) is constructed of the proper size to fit into the opening in the top of the base, where it is secured by means of catches *e e*, which are attached to the under side of the annular piece D, so as to project slightly beyond the edge thereof. These projections take into the groove formed by the circular ledges *o o*, as shown in Figs. 1 and 2, being introduced into this groove through notches or spaces *h h*, cut in the lower ledge, *o*, after which, by turning the ring D either to the right or to the left, they are securely locked in place.

The piece D is provided with a groove on its upper surface, near its inner edge, for the bottom of the globe to rest in, as shown in Fig. 1.

A metal band or ring, F, is fitted within the lower part of the cap A or upper part of the frame, so that its lower edge may rest upon the shoulder *m*, formed on the globe C near its upper end. Portions of the edge of this band are cut away, so as to form inclines *l l*, as shown more clearly in Fig. 4. A wire or rod, *n*, as shown in section in Fig. 1, extends across the interior of the cap A, and in such a position that when the band F is inserted in the cap and turned the inclines *l l* will come in contact therewith, the two ends of the rod serving as stops or abutments, in connection with the respective inclines, to force the ring or band down into a firm bearing upon the upper end of the globe.

Near the center of the bottom of the lantern two spiral flat strips of metal, *g*, are secured, these strips being soldered or otherwise fastened at one end only, the other end being left loose and slightly raised. A cross-bar, *f*, is secured at each end to the bottom of the lamp E. This bar *f*, being entered under the loose ends of the wires or strips *g*, as shown in Fig. 3, can then be turned so as to be securely fastened thereby, thus holding the lamp firmly in place. A reverse movement serves to release the lamp whenever it is desired to remove it for any purpose whatever.

To remove the globe it is only necessary to open the base and turn the disk or ring D far enough to bring the ends of the catches *e e* opposite the notches *h h* in the lower ledge, *o*, when it can be removed and the globe be withdrawn through the opening. When the globe is inserted in place it is held firmly in its seat by simply turning the band F, which can be readily done by means of the pin or handle *i*, which causes it to be forced down upon the globe by the conjoint action of the inclines *l l* and the ends of the rod *n*.

By these means there is produced a lantern having the lamp and base at all times securely attached, and which is not rendered valueless by the breaking of the globe, as is the case in lanterns of the ordinary construction, in which the globe is either cemented in place or is inserted loosely, with no adjustable device to hold it steady against rattling, and one in which a new globe can be inserted or the old one removed almost instantly and at pleasure.

What is claimed as new is—

1. The upper portion of the base B, constructed to admit of the passage of an adjustable globe through it, and made a part of the guard, and also connected with the lower or flanged portion by a hinge and spring, substantially as shown.

2. The combination of the lower portion of the base B, which supports the lamp, with the upper vertical portion, which forms a part of the guard in a lantern having the globe removable through such upper portion of the base, substantially as specified.

3. The disk or ring D, provided with the catches or lugs *c e*, in combination with the projections or ledges *o o* of the base B, arranged and operating as and for the purposes set forth.

4. In combination with strips or wires *g*, a cross-bar, *f*, for securing the lamp to the bottom of the lantern, substantially as described.

5. In combination with the globe of a loose-globe lantern, a vertically-adjustable band or ring for holding the globe steady in its seat, substantially as described.

6. The combination, in a loose-globe lantern, of inclined planes, acting in conjunction with suitably-arranged stops as a means of operating a vertically-adjustable ring or band for holding the globe steady in its seat, substantially as described.

THE ADAMS & WESTLAKE MANUFACTURING CO.,
By J. McGREGOR ADAMS, *President*. [L. S.]

Witnesses:
F. FLAMMER,
A. WEINBERG.